Feb. 19, 1935.  D. W. LLOYD  1,991,902
BRAKE VALVE DEVICE
Filed Nov. 13, 1930
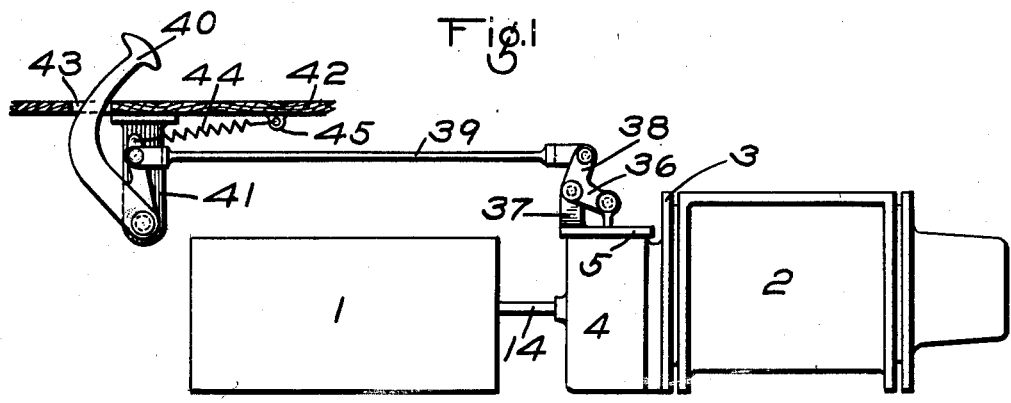
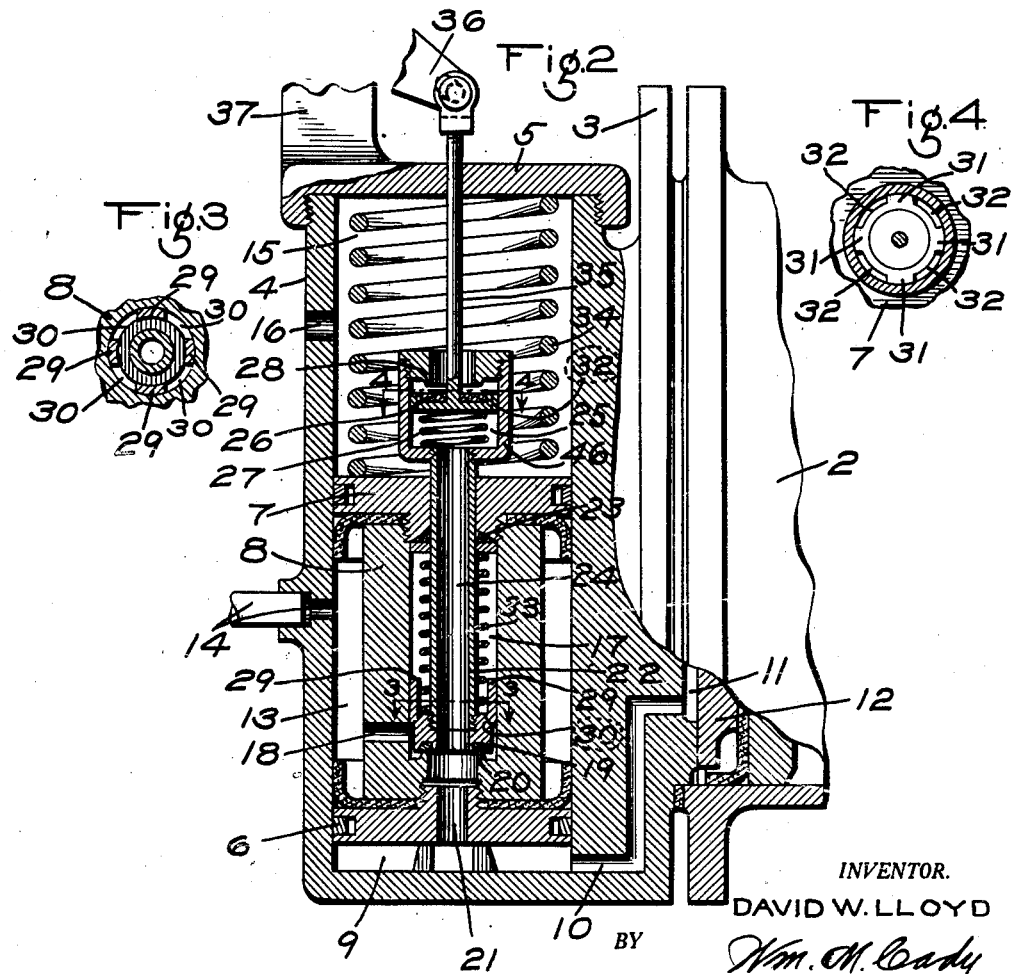
INVENTOR.
DAVID W. LLOYD
BY
Wm. M. Cady
ATTORNEY.

Patented Feb. 19, 1935

1,991,902

UNITED STATES PATENT OFFICE 1,991,902

BRAKE VALVE DEVICE

David W. Lloyd, Clayton, Mo., assignor to The Westinghouse Air Brake Company, Wilmerding, Pa., a corporation of Pennsylvania Application November 13, 1930, Serial No. 495,383

15 Claims. (Cl. 303—54)

This invention relates to control valve devices for fluid pressure apparatus and more particularly to brake valve devices of the self lapping type for controlling the operation of fluid pressure brake apparatus.

The principal object of my invention is to provide an improved self lapping brake valve device by means of which the application and release of the brakes may be easily and accurately graduated.

In the self lapping brake valve devices heretofore employed, the force required to control their operation to graduate the application and release of the brakes is proportional to the pressure of fluid in the brake cylinder or brake chamber as the case may be, in other words, the power developed manually must be sufficient to overcome brake cylinder pressure acting on one side of a movable abutment such as a piston or a flexible diaphragm. In some cases it has been found that as high as fifty pounds manual pressure on the pedal of a pedal operated valve is required to operate the brake valve to effect a full application of the brakes. This is objectionable in that it tends to tire the operator and renders it difficult for the operator to accurately control the application and release of the brakes.

Another object of my invention is to provide a self lapping brake valve device which is operative to control the brakes by a predetermined minimum manual pressure and without opposition by brake cylinder pressure.

A further object of my invention is to mount the brake valve device on the brake cylinder so as to provide a close and direct connection between the main reservoir and the brake cylinder through which fluid under pressure may be promptly supplied and released from the brake cylinder, thus eliminating the relay valve device commonly employed for this purpose.

Other objects and advantages will appear in the following more detailed description of the invention.

In the accompanying drawing; Fig. 1 is a diagrammatic side elevational view of a fluid pressure brake equipment embodying my invention, a portion of the floor of a vehicle being shown in section; Fig. 2 is a fragmentary view of the brake cylinder and brake valve device, the brake valve device being shown in section; and Figs. 3 and 4 are detail sectional views taken on the lines 3—3 and 4—4 of Fig. 2.

As shown in the drawing, the fluid pressure brake equipment may comprise a main reservoir 1 and a brake cylinder 2 having a pressure head 3 which carries a brake valve device 4. The operation of the brake valve device is adapted to be controlled through the medium of any desired mechanism, one of which mechanisms is shown in the drawing and will be hereinafter fully described.

The casing of the brake valve device 4, as shown, may be integral with the pressure head 3 of the brake cylinder and may be made in the form of a cylinder having one open end which is closed by a cap 5 having screw-threaded connection with the casing. Contained in this cylinder are pistons 6 and 7 which are secured together in spaced relation to each other by a hollow member 8, said pistons having screw-threaded connection with the ends of the member 8.

At one side of the piston 6 there is a chamber 9 which is constantly connected through a passage 10 to the pressure chamber 11 of the brake cylinder at one side of the usual brake cylinder piston 12. Between the pistons 6 and 7 there is a chamber 13 to which the main reservoir 1 is constantly connected through a pipe and passage 14 and at one side of the piston 7 there is a chamber 15 which is constantly open to the atmosphere through a passage 16.

The member 8 has an axial bore or chamber 17 to which the chamber 13 is constantly connected through a passage 18. Contained in the chamber 17 is an application valve 19 which is adapted to seat on an annular seat rib 20 formed on the member 8, and is operative to control communication between the valve chamber 17 and the piston chamber 9 by way of passage 21 through one end of the member 8 and the piston 6.

The application valve 19 is provided with a stem 22, the outer end portion of which extends through an axial bore in the piston 7 and terminates beyond the outer face of the piston. The association of the stem 22 and the piston 7 is such that either may be moved longitudinally relative to the other as will hereinafter appear, suitable packing 23 being provided for preventing leakage from the chamber 17 to the chamber 15.

The valve stem 22 and valve 19 are each provided with an axial bore and when the valve and stem are secured together these bores register and form a passage 24 which is open at one end to the passage 21 leading to the piston chamber 9 and is open at the other end to a release valve chamber 25 in a valve casing 46 which is contained in the chamber 15 and which has screw-threaded connection with the outer end of the valve stem 22.

Contained in the valve chamber 25 is a release valve 26 which is subject to the pressure of a light spring 27 which tends to seat the valve on an annular seat rib 28. This valve is operative to control communication from the valve chamber 25 to the chamber 15.

The application valve 19 is provided with spaced guides 29 which slidably engage with the interior surface of the member 8 to guide the valve as it is moved to and from its seat. Between these guides, openings 30 are provided through which fluid under pressure supplied through the passage 18 may flow to the chamber 17. The release valve 26 is provided with spaced guides 31 which engage with the interior surface of the release valve casing and guide the valve in its operation to and from its seat. Between the guides, openings 32 are provided through which fluid under pressure from the valve chamber 25 may flow to the chamber 15 when the release valve is unseated.

The application valve 19 is subject to the pressure of a coil spring 33 which is contained in the chamber 17 of the member 8 and which surrounds the valve stem 22.

Contained in the chamber 15 and interposed between and engaging the inner surface of the cap 5 of the brake valve casing and the outer surface of the piston 7 is a coil spring 34, the pressure of which tends to resist outward movement of the pistons 6 and 7.

The release valve 26 is provided with a stem 35 which extends outwardly from the valve and through an opening in the cap 5 of the casing and beyond this cap, is operatively connected to an arm 36 of a bell crank lever pivotally mounted on a bracket 37 extending outwardly from the cap, the arm 38 of the lever being operatively connected to one end of an operating rod 39.

For the purpose of operating the rod 39 and thereby control the operation of the brake valve device, a foot pedal 40 is provided which is pivotally mounted on a bracket 41 secured to the under side of the floor 42 of the vehicle. The upper end portion of the pedal extends through an opening 43 in the floor and above the floor is adapted to be engaged by a foot of an operator.

Above the pivot point of the foot pedal and beneath the vehicle floor, the outer end of the rod 39 is operatively connected to the pedal.

Arranged beneath the floor 42 is a release spring 44, one end of which is secured to the pedal above its pivot point and the opposite end is fixed to a bracket 45 secured to the floor.

The initial tension of this spring 44 is such that it will cause the release valve 26 of the brake valve device to be maintained in release position against the opposing pressure of the light spring 27 as shown in Fig. 2. The spring 27 is merely for the purpose of preventing the valve from rattling against the valve casing in transit and has no material effect upon the operation of the brake valve device as a whole.

With the brake valve device 4 in release position as shown in Fig. 2, the application valve 19 is maintained seated by the pressure of the spring 33 and the release valve 26 is maintained unseated by the power of the release spring 44 as transmitted through the pedal 40, rod 39 and bell crank lever and valve stem 35. With the release valve 26 thus unseated, the brake cylinder piston chamber 11 is connected to the atmosphere through passage 10, piston chamber 9 in the brake valve device, passages 21 and 24, release valve chamber 25 openings 32, past the unseated valve, through chamber 15 and passage 16.

To effect an application of the brakes, the foot pedal 40 is moved forwardly against the resistance of the spring 44 and through the medium of the operating rod 39 causes the bell crank to rotate about its pivot in a counter-clockwise direction. The bell crank lever, as it is thus operated, causes the release valve 26 to move outwardly relative to the release valve casing 46 until the valve seats on the seat rib 28, after which, the continued operation of the bell crank lever causes the release valve to move the casing 46, valve stem 22 and application valve 19 outwardly relative to the piston assembly against the opposing pressure of the spring 33, unseating the application valve from the seat ring 20.

With the application valve 19 thus unseated fluid under pressure from the chamber 13 as supplied from the main reservoir 1 through pipe and passage 14 flows to the brake cylinder piston chamber 11 through passage 18 in the member 8, passage 21, piston chamber 9 and passage 10, causing the brake cylinder piston 12 to move outwardly to effect an application of the brakes.

Now when the pressure of fluid in the piston chamber 9 acting on the piston 6 is sufficient to overcome the opposing pressure of the spring 34 acting on the piston 7, the piston assembly will be caused to move outwardly from the position as shown in Fig. 2 relative to the application and release valve assembly until the seat ring 20 on the member 8 engages the valve 19. When the seat 20 is thus brought into engagement with the valve 19, the supply of fluid from the main reservoir 1 to the brake cylinder is cut off so that the outward movement of the piston assembly will cease. Since the release valve 26 is held closed by the operator's foot pressure on the foot pedal 40, the brake cylinder pressure is retained.

If, when the several parts of the brake valve device have been operated to lap position as just described, it is desired to partially release the brakes, the operator relieves the foot pedal 40 of a portion of his foot pressure. When the operator does this, the power of the release spring 44 causes the foot pedal 40, rod 39, and bell crank lever to operate to unseat the release valve 26 from the seat rib 28 against the pressure of the spring 27 and the pressure of fluid in the release valve chamber 25. With the release valve thus unseated, fluid under pressure is released from the brake cylinder piston chamber 11 to the atmosphere by way of passage 10, piston chamber 9, passages 21 and 24, release valve chamber 25, openings 32 about the release valve spring chamber 15, and passage 16.

As the pressure of fluid in the brake cylinder chamber 11 and consequently in piston chamber 9 is thus reduced, the pressure of the spring 34 causes the piston assembly to move inwardly. As the piston assembly thus moves, the pressure of the spring 33 will maintain the application valve 19 seated, in other words, as the piston assembly moves, the application valve 19, valve stem 22 and release valve casing 46 move with it as a unit. Now when the seat ring 28 on the release valve casing engages the valve 26 which is maintained stationary by foot pressure on the pedal 40, the release of fluid from the brake cylinder is closed off and the desired pressure is retained in the brake cylinder.

If it is desired to fully release the brakes, the operator removes his foot from the pedal 40 and when he does this, the release valve will be maintained unseated as the several parts of the brake valve device move toward release position, and as shown in Fig. 2, will be maintained unseated while these parts are in release position.

It will be here noted that in effecting an application of the brakes and in maintaining the brakes applied, fluid at brake cylinder pressure acts upon the back surface of the release valve 26 and consequently tends to move the release valve casing 46, stem 22 and application valve relative to the piston assembly. However, the value of the spring 33 is such that it will counteract this tendency and will prevent this undesirable movement of the valve assembly relative to the piston assembly.

From the foregoing description, it will be seen that in applying the brakes and holding them applied, the operator's foot pressure is not resisted by brake cylinder pressure but rather by the force of the springs 44 and 33 which may be overcome by light foot pressures, the maximum of which may be five or six pounds.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. An automatically lapping control valve device for fluid pressure operated mechanism, comprising a casing, a movable abutment forming a pressure chamber in said casing and subject to the opposing pressures of a spring and fluid in said chamber, a valve operative manually for supplying fluid under pressure to said chamber, and a spring interposed between said abutment and valve for alone opposing at all times the operation of said valve toward its fluid supplying position, said abutment being movable by fluid under pressure supplied to said chamber into engagement with said valve to close off the supply of fluid to the chamber.

2. An automatically lapping control valve device for fluid pressure operated mechanism, comprising a casing, a movable abutment forming a pressure chamber in said casing and subject to the opposing pressures of a spring and fluid in said chamber, a valve operative manually for supplying fluid under pressure to said chamber, and a single means interposed between said abutment and valve for alone opposing at all times the operation of the valve toward its fluid supplying position, said abutment being movable by fluid under pressure supplied to said chamber into engagement with said valve to close off the supply of fluid to the chamber.

3. An automatically lapping control valve device for fluid pressure operated mechanism, comprising a casing, a movable abutment forming a pressure chamber in said casing and subject to the opposing pressures of a spring and fluid in said chamber, a valve cooperating with said abutment to control the supply of fluid under pressure to said chamber, said valve being movable relative to said abutment for supplying fluid under pressure to said chamber and the abutment being movable relative to said valve for closing off the supply of fluid under pressure to said chamber, and a spring for alone opposing at all times movement of said valve relative to said abutment toward its fluid supplying position.

4. An automatically lapping control valve device for fluid pressure operated mechanism, comprising a casing, a movable abutment forming a pressure chamber in said casing and subject to the opposing pressures of a spring and fluid in said chamber, a valve cooperating with said abutment to control the supply of fluid under pressure to said chamber, said valve being movable relative to said abutment for supplying fluid under pressure to said chamber and the abutment being movable relative to said valve for closing off the supply of fluid under pressure to said chamber, and a spring interposed between said valve and abutment for alone opposing at all times movement of said valve relative to said abutment toward its fluid supplying position.

5. An automatically lapping control valve device for fluid pressure operated mechanism, comprising a casing, a movable abutment forming a spring chamber, a supply chamber and a pressure chamber in said casing, a valve carried by said abutment and movable relative thereto for establishing communication through which fluid under pressure is supplied from said supply chamber to said pressure chamber, a spring alone opposing at all times the movement of said valve toward its communication establishing position, said abutment being operative by fluid under pressure in said pressure chamber to cooperate with said valve to close communication from the supply chamber to said pressure chamber, and a spring in said spring chamber opposing the operation of said abutment.

6. An automatically lapping control valve device for fluid pressure operated mechanism, comprising a casing, a spring in said casing, a movable abutment forming a pressure chamber in said casing and subject to the opposing pressures of said spring and fluid in said chamber, a supply valve mounted in said abutment and movable forwardly relative thereto to control the supply of fluid under pressure to said chamber, a stem for said valve, said valve and stem having a passage formed therein through which fluid under pressure is released from said chamber, and a release valve operative for controlling the flow of fluid through said passage and for pulling the supply valve forwardly for supplying fluid under pressure to said chamber.

7. An automatically lapping control valve device for fluid pressure operated mechanism, comprising a casing, a spring in said casing, a movable abutment forming a pressure chamber in said casing and subject to the opposing pressures of said spring and fluid in said chamber, a supply valve mounted in said abutment and movable relative thereto to control the supply of fluid under pressure to said chamber, a stem for said valve, said valve and stem defining a passage through which fluid under pressure is released from said chamber, and a release valve operative a limited distance in one direction to close communication through said passage and operative when said communication is closed to move the supply valve to supply fluid under pressure to said chamber.

8. An automatically lapping control valve device for fluid pressure operated mechanism, comprising a casing, a spring in said casing, a movable abutment forming a pressure chamber in said casing and subject to the opposing pressures of said spring and fluid in said chamber, a supply valve mounted in said abutment and movable relative thereto to control the supply of fluid under pressure to said chamber, a stem for said valve, the outer end portion of said stem projecting beyond one end of said abutment, said valve and stem being hollow and defining a passage through which fluid under pressure is released from said chamber, and a release valve mechanism carried by the outer end portion of said stem and operative to control the flow of fluid through said passage.

9. In a fluid pressure brake equipment, the combination with a brake cylinder, of a brake valve device operative to control the supply of fluid under pressure to and the release of fluid under pressure from the brake cylinder and comprising a casing, a movable abutment forming a fluid pressure supply chamber and a pressure chamber, there being a passage in said casing connecting said pressure chamber to said brake cylinder, a valve normally closing communication from said supply chamber to said pressure chamber and having a passage through which fluid under pressure from said pressure chamber and brake cylinder is adapted to be discharged to the atmosphere, said valve being movable forwardly relative to the abutment to open communication from said supply chamber to said pressure chamber and brake cylinder, and valve means operative to first close communication from said pressure chamber and brake cylinder to the atmosphere through the passage in said valve and to then pull said valve forwardly to open communication from the supply chamber to the pressure chamber and brake cylinder.

10. In a fluid pressure brake equipment, the combination with a brake cylinder, of a brake valve device operative to control the supply of fluid under pressure to and the release of fluid under pressure from the brake cylinder and comprising a casing, a movable abutment forming a fluid pressure supply chamber and a pressure chamber, there being a passage in said casing connecting said pressure chamber to said brake cylinder, a valve normally closing communication from said supply chamber to said pressure chamber and having a passage through which fluid under pressure from said pressure chamber and brake cylinder is adapted to be discharged to the atmosphere, said valve being movable forwardly relative to the abutment to open communication from said supply chamber to said pressure chamber and brake cylinder, and valve means operative to first close communication from said pressure chamber and brake cylinder to the atmosphere through the passage in said valve and to then pull said valve forwardly to open communication from the supply chamber to the pressure chamber and brake cylinder, said abutment being movable relative to said valve by fluid under pressure supplied to said pressure chamber and brake cylinder into engagement with said valve for closing communication from said supply chamber to said pressure chamber and brake cylinder.

11. In a fluid pressure brake equipment, the combination with a brake cylinder, of a brake valve device operative to control the supply of fluid under pressure to and the release of fluid under pressure from the brake cylinder and comprising a casing, a movable abutment forming a fluid pressure supply chamber and a pressure chamber, there being a passage in said casing connecting said pressure chamber to said brake cylinder, a valve normally closing communication from said supply chamber to said pressure chamber and having a passage through which fluid under pressure from said pressure chamber and brake cylinder is adapted to be discharged to the atmosphere, said valve being movable forwardly relative to the abutment to open communication from said supply chamber to said pressure chamber and brake cylinder, and valve means operative to first close communication from said pressure chamber and brake cylinder to the atmosphere through the passage in said valve and to then pull said valve forwardly to open communication from said supply chamber to said pressure chamber and brake cylinder.

12. In a fluid pressure brake equipment, the combination with a brake cylinder, of a brake valve device operative to control the supply of fluid under pressure to and the release of fluid under pressure from the brake cylinder and comprising a casing, a movable abutment forming a fluid pressure supply chamber and a pressure chamber, there being a passage in said casing connecting said pressure chamber to said brake cylinder, a valve normally closing communication from said supply chamber to said pressure chamber and having a passage through which fluid under pressure from said pressure chamber and brake cylinder is adapted to be discharged to the atmosphere, said valve being movable forwardly relative to the abutment to open communication from said supply chamber to said pressure chamber and brake cylinder, valve means operated to first close communication from said pressure chamber and brake cylinder to the atmosphere through the passage in said valve and to then pull said valve forwardly to open communication from said supply chamber to said pressure chamber and brake cylinder, said abutment being movable by fluid under pressure supplied to said pressure chamber and brake cylinder into cooperation with said valve to close off the flow of fluid under pressure from said supply chamber to said pressure chamber and brake cylinder, and means yieldably resisting movement of said abutment.

13. An automatically lapping control valve device for fluid pressure operable mechanism, said valve device comprising a casing having a pressure chamber and a communication through which fluid under pressure is adapted to flow from said chamber to the mechanism, a valve member operative to establish communication through which fluid under pressure is supplied to said chamber, a movable abutment cooperating with said valve member and subject to the pressure of fluid in said chamber for limiting the supply of fluid under pressure to said chamber, the fluid pressures effective on opposite sides of the valve member being normally balanced whereby the movement of the valve member to its fluid supplying position is unopposed by fluid pressure, and means for actuating said valve member.

14. An automatically lapping control valve device for fluid pressure operable mechanism, said valve device comprising a casing having a pressure chamber and a communication through which fluid under pressure is adapted to flow from said chamber to the mechanism, a valve member operative to establish communication through which fluid under pressure is supplied to said chamber, a movable abutment cooperating with said valve member and subject to the pressure of fluid in said chamber for limiting the supply of fluid under pressure to said chamber, the movement of said valve member to its fluid supplying position being unopposed by fluid pressure, and means for actuating said valve member.

15. An automatically lapping control valve device for fluid pressure operable mechanism, said valve device comprising a casing having a chamber normally charged with fluid under pressure, a chamber through which fluid under pressure is adapted to flow to the mechanism, a valve member having opposite faces of substantially equal area subjected to the pressure of fluid from the normally charged chamber and operative to establish communication through which fluid under pressure is supplied from the normally charged chamber to the other chamber, a movable abutment mounted in said casing and cooperating with said valve member and subject to the pressure of fluid in said other chamber for limiting the supply of fluid under pressure to said other chamber, means for actuating said valve member, and a spring for alone opposing at all times the movement of the valve to a fluid supplying position.

DAVID W. LLOYD.